(12) United States Patent
Arai

(10) Patent No.: US 8,330,706 B2
(45) Date of Patent: Dec. 11, 2012

(54) LIGHTING DEVICE FOR DISPLAY DEVICE AND DISPLAY DEVICE

(75) Inventor: Masahiro Arai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 385 days.

(21) Appl. No.: 12/598,959

(22) PCT Filed: Dec. 25, 2007

(86) PCT No.: PCT/JP2007/074794
§ 371 (c)(1),
(2), (4) Date: Nov. 5, 2009

(87) PCT Pub. No.: WO2008/139663
PCT Pub. Date: Nov. 20, 2008

(65) Prior Publication Data
US 2010/0156952 A1    Jun. 24, 2010

(30) Foreign Application Priority Data

May 16, 2007    (JP) .................................. 2007-130603

(51) Int. Cl.
*G09G 3/36*    (2006.01)
(52) U.S. Cl. .................... 345/102; 345/211; 345/212
(58) Field of Classification Search .................. 345/102, 345/204, 211
See application file for complete search history.

(56) References Cited

U.S. PATENT DOCUMENTS

| | | | |
|---|---|---|---|
| 5,844,540 A | 12/1998 | Terasaki | |
| 6,466,196 B1 * | 10/2002 | Isogawa et al. | 345/102 |
| 6,812,681 B1 * | 11/2004 | Hong et al. | 323/283 |
| 2002/0050973 A1 * | 5/2002 | Takaoka et al. | 345/100 |
| 2002/0147861 A1 * | 10/2002 | Bui et al. | 710/1 |
| 2006/0125767 A1 | 6/2006 | Kang et al. | |
| 2006/0227860 A1 * | 10/2006 | Leung et al. | 375/238 |
| 2008/0074381 A1 * | 3/2008 | Kumamoto | 345/102 |

FOREIGN PATENT DOCUMENTS

| | | |
|---|---|---|
| JP | 63-18797 U | 2/1988 |
| JP | 2004-55431 A | 2/2004 |

OTHER PUBLICATIONS

Official Communication issued in International Patent Application No. PCT/JP2007/074794, mailed on Feb. 26, 2008.

* cited by examiner

*Primary Examiner* — Alexander S Beck
*Assistant Examiner* — Charles Zheng
(74) *Attorney, Agent, or Firm* — Keating & Bennett, LLP

(57) ABSTRACT

A lighting device for a display device includes a light source and a light source control device arranged to control the light source. The light source control device is arranged to generate a pulse signal as a light source control signal Vcon to control the light source. The light source control signal Vcon includes pulses, which individually have different shapes.

10 Claims, 7 Drawing Sheets

LIGHTING DEVICE FOR DISPLAY DEVICE AND DISPLAY DEVICE

BACKGROUND OF THE INVENTION

1. Field of the Invention

The present invention relates to a lighting device for a display device and a display device using the same.

2. Description of the Related Art

In a display device having non-luminous optical elements as typified by a liquid crystal display device, a backlight device is provided on the backside of a display panel such as a liquid crystal panel, so as to illuminate the display panel.

Conventionally, a voltage-controlled dimming system or a PWM (Pulse Wide Modulation) dimming system is used as a dimming system for a backlight. The voltage-controlled dimming system controls the voltage applied to a fluorescent tube via an inverter for dimming purposes, by which a wide dimming range cannot be provided.

On the other hand, the PWM dimming system periodically turns a light source on and off for dimming purposes, while controlling the time ratio between light-on periods and light-off periods. This system can provide a wide dimming range by adjusting the on-off time cycle. Therefore, many liquid crystal display devices employ the PWM dimming system for a backlight.

In recent years, techniques for using a plurality of PWM signals in combination have been also developed. For example, in order to improve visibility of moving images, JP-A-2006-53520 discloses a technique that generates a new periodic signal by combining two kinds of PWM signals, i.e., a PWM signal for setting light-on periods and a PWM signal for setting light-off or black insertion periods, by which an on-off operation of a light source is repeated during each light-on period.

In a backlight device thus using the PWM dimming system for dimming control, beat tones may be generated during the dimming control of fluorescent tubes, due to the second and third harmonics of a dimming control frequency. The beat tones may cause discomfort for a user, and therefore generation thereof must be suppressed.

The beat tones may result from various factors. The factors include an abrupt increase of a tube current flowing through a fluorescent tube and a momentary flow of an excitation current immediately preceding turn-on, which cause magnetostriction (called a whisker voltage), known to contribute to generating beat tones (as shown in JP-A-2004-55431, for example), when the fluorescent tube turns from OFF to ON.

According to the invention described in JP-A-2004-55431, elimination of beat tones can be achieved by a dimming means that controls the pulse rise time of PWM signals in order to suppress the whisker voltage.

However, the control of the pulse rise time of PWM signals fails to achieve adequate elimination of beat tones. Therefore, the factors contributing to generating beat tones may include factors other than the whisker voltage, and the inventor of the present application discovered that periodical vibration of a chassis covering light sources contributes to generating beat tones.

SUMMARY OF THE INVENTION

Accordingly, preferred embodiments of the present invention provide a lighting device for a display device having a construction capable of preventing periodical vibration of a chassis and thereby preventing or minimizing beat tones. In addition, preferred embodiments of the present invention provide a high-quality and highly-reliable display device including such an improved lighting device.

A lighting device for a display device, according to a preferred embodiment of the present invention, includes a light source and a light source control device configured to control the light source, in which the light source control device is arranged to generate a pulse signal as a light source control signal to control the light source. The light source control signal includes pulses, which individually have different shapes.

The inventor of the present application has thoroughly examined the beat tones, and discovered that vibration of a chassis caused by leakage current from a fluorescent tube (or light source) is a major factor in generating the beat tones. It has also been discovered that the generation of beat tones is facilitated by the monotonous periodicity of a signal (hereinafter, sometimes referred to as a periodic signal) generated by a periodic signal generating circuit such as a PWM signal generating circuit. In this regard, the inventor of the present application has developed the following causal theory.

The chassis is typically formed of conductive metal. Therefore, when current is applied to the light source, a capacitor is formed between the light source and the chassis, which may cause current leakage from the light source to the chassis. A force acting on the chassis can be generated due to the leakage current, which causes the chassis to vibrate resulting in beat tones.

Further, as a result of on-off control according to a periodic signal or pulse signals generated at a constant frequency, the light source periodically repeats ON and OFF, and accordingly the above-described leakage current causes periodic vibration of the chassis. When the chassis thus vibrates constantly with the same period, the vibration amplitude of the chassis is increased, and thereby the generation of beat tones due to the vibration of the chassis is facilitated. Moreover, the beat tones thus generated are within the audible frequency range, and are also periodic. Therefore, a user will be forced to hear the same noise constantly and repeatedly, and thereby the user will feel more uncomfortable.

In view of this, the lighting device for a display device, according to a preferred embodiment of the present invention, provides a light source control signal to control the light source, which includes pulses individually having different shapes. Thereby, beat tones can be prevented or minimized.

That is, if a light source control signal formed of pulses individually having different shapes is thus used for control of the light source, the light source can be aperiodically turned on. Therefore, the period of vibration of the chassis caused by leakage current from the light source can be non-constant, resulting in prevention of an increase in vibration amplitude of the chassis. Consequently, the facilitation of generation of beat tones, which may be due to periodic vibration of the chassis, can be prevented.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred Embodiment 1

A preferred embodiment 1 of the present invention will be explained with reference to FIGS. 1 to 4.

Figure 1:
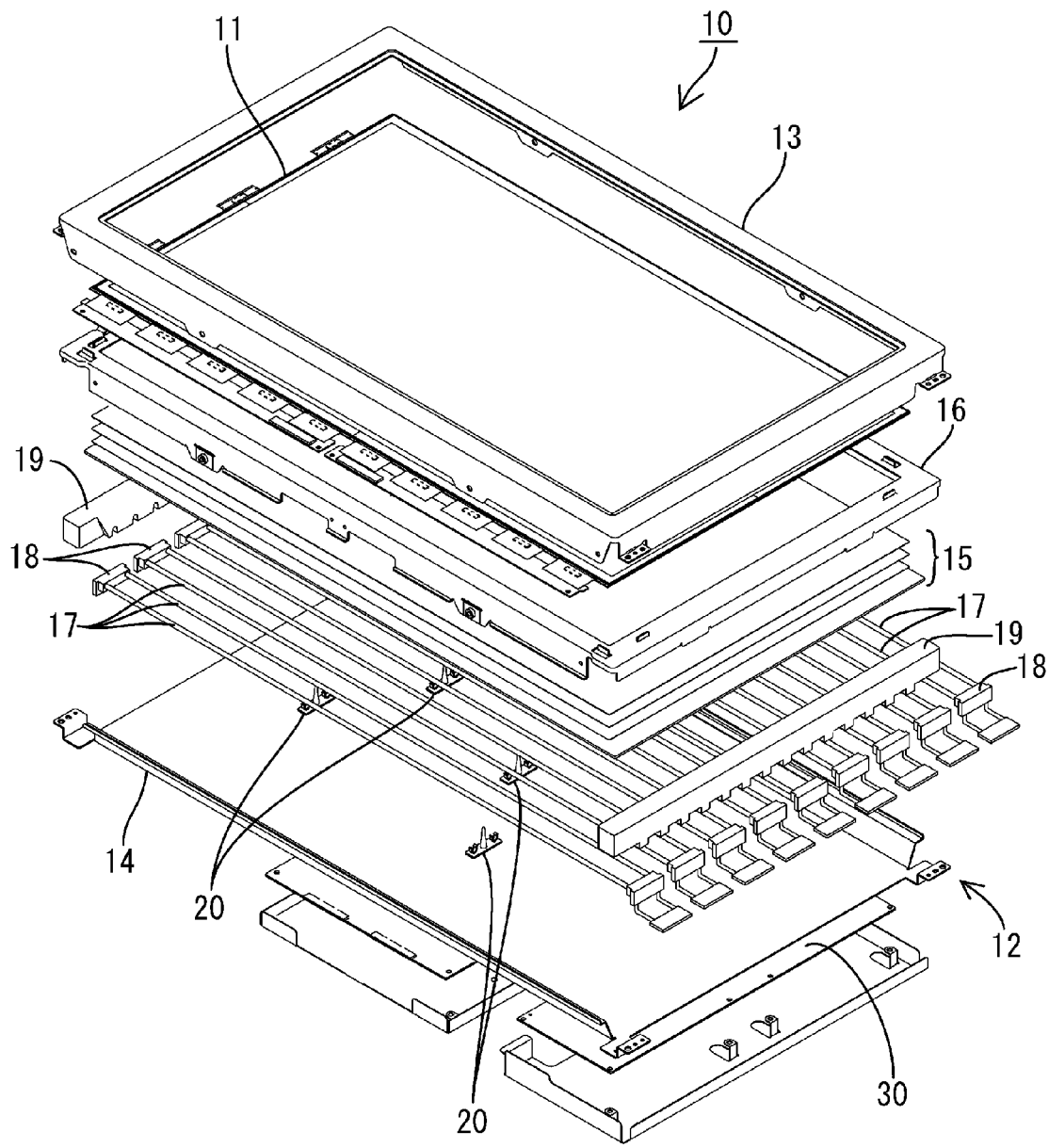
FIG. 1 is an exploded perspective view showing the general construction of a liquid crystal display device according to preferred embodiment 1 of the present invention.
Figure 2:
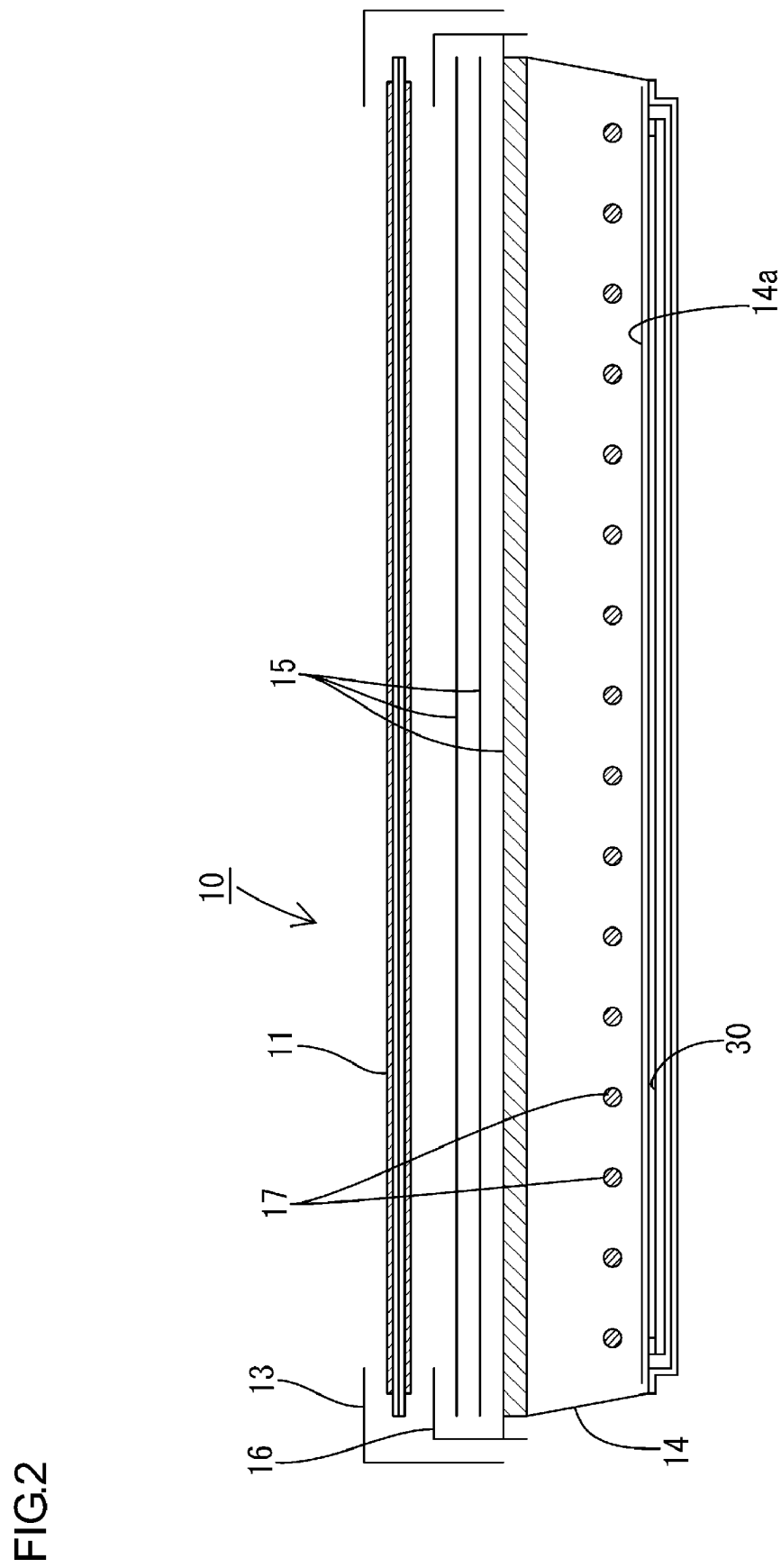
FIG. 2 is a sectional view showing the general construction of the liquid crystal display device shown in FIG. 1.
Figure 3:
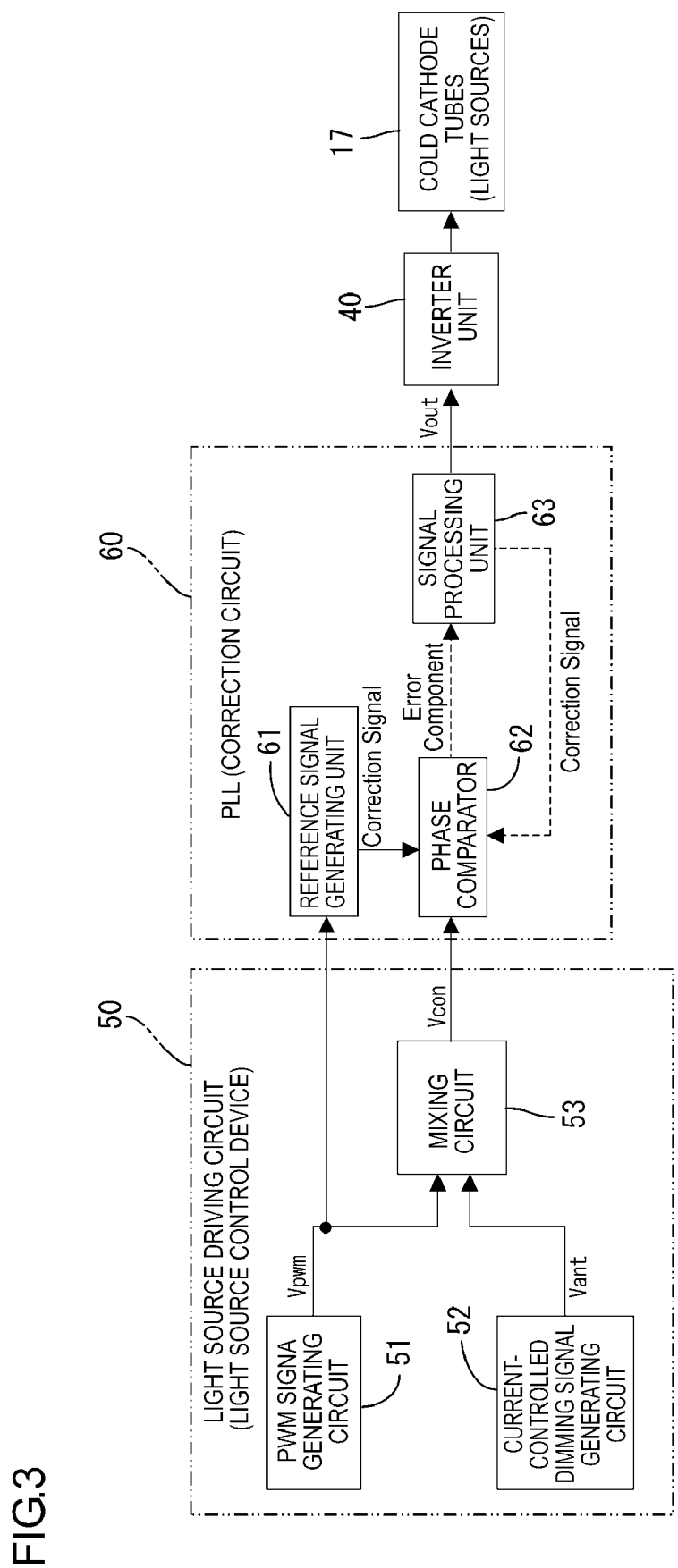
FIG. 3 is a block diagram showing a circuit configuration involved in light source control of a backlight device included in the liquid crystal display device shown in FIG. 1.
Figure 4:
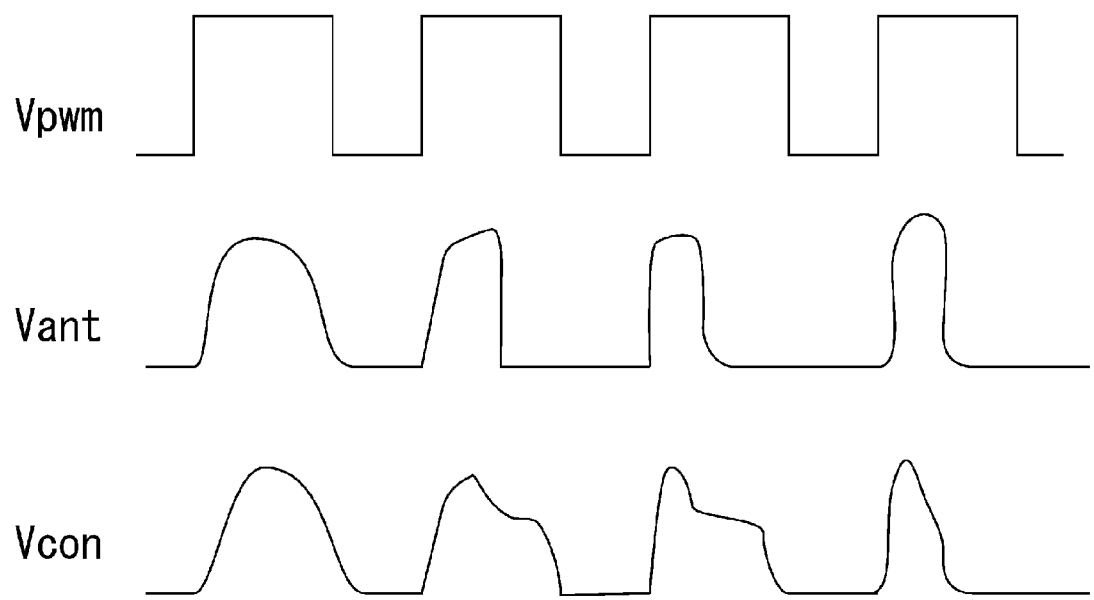
FIG. 4 is a waveform chart showing signals outputted from various sections of the backlight device included in the liquid crystal display device shown in FIG. 1.

FIG. 1 is an exploded perspective view showing the general construction of a liquid crystal display device according to the present preferred embodiment. FIG. 2 is a sectional view showing the general construction of the liquid crystal display device. FIG. 3 is a block diagram showing a circuit configuration involved in light source control of a backlight device. FIG. 4 is a waveform chart showing waveforms outputted from various sections of the backlight device.

The general construction of the liquid crystal display device (display device) 10 according to the present preferred embodiment will be explained first. Referring to FIGS. 1 and 2, the liquid crystal display device 10 preferably includes a liquid crystal panel 11 having a rectangular or substantially rectangular shape, and a backlight device (lighting device for a display device) 12 as an external light source, which are integrally held by a bezel 13 and the like. The liquid crystal panel 11 includes a pair of glass substrates, which are attached to each other so as to face each other while a gap of a predetermined size is kept therebetween. Liquid crystal is sealed between the glass substrates. On one of the glass substrates, components such as switching elements (e.g., TFTs) connected to source wiring lines and gate wiring lines running at right angles to each other, and pixel electrodes connected to the switching elements are provided. On the other of the glass substrates, components such as a counter electrode and a color filter having R, G, and B color sections arranged in a predetermined pattern are provided.

Next, the backlight device 12 will be explained. The backlight device 12 is a so-called direct-light type backlight device that includes a plurality of linear light sources (e.g., cold cathode tubes (light sources) 17 as high-pressure discharge tubes, in the present preferred embodiment), which are positioned directly below the back surface of the liquid crystal panel 11 (i.e., the panel surface on the opposite side of the display side), and are arranged along the panel surface.

The backlight device 12 includes a backlight chassis (sometimes referred to as a chassis) 14 having a substantially box-like shape with an opening on its upper side, and a plurality of optical members 15 (e.g., a diffuser plate, a diffusing sheet, a lens sheet and an optical sheet, in order from the lower side of the figure) which are arranged to cover the opening of the backlight chassis 14. Further included is a frame 16 arranged to hold the optical members 15 on the backlight chassis 14. The backlight chassis 14 contains the cold cathode tubes 17, rubber holders 18 arranged to hold the end portions of the cold cathode tubes 17, lamp holders 19 arranged to collectively cover the cold cathode tubes 17 and the holders 18, and lamp clips 20 arranged to mount and hold the cold cathode tubes 17 on the backlight chassis 14. Note that the optical member 15 side of the cold cathode tubes 17 corresponds to the light emitting side of the backlight device 12.

Each cold cathode tube 17 preferably has an elongated tubular shape, for example. A number (e.g., eighteen in FIG. 1) of cold cathode tubes 17 are arranged in the backlight chassis 14 so that the longitudinal direction (or axial direction) thereof corresponds with the long-side direction of the backlight chassis 14. On the other hand, the lamp clips 20, arranged to mount the cold cathode tubes 17 to the backlight chassis 14, function as clip members for holding light sources, and are preferably made of synthetic resin (e.g., polycarbonate). The plurality of lamp clips 20 are mounted on the backlight chassis 14 so as to support each of the cold cathode tubes 17 preferably at two or three points spaced along the longitudinal direction thereof.

The backlight chassis 14 is preferably formed of a metallic plate. A light reflecting sheet 14a is provided on the inner surface side (light source side) of the backlight chassis 14, which defines a light reflecting surface. The backlight chassis 14 thus includes the light reflecting sheet 14a, and thereby the light from the cold cathode tubes 17 can be reflected to the optical members 15 such as the diffuser plate (hereinafter, sometimes referred to as "the diffuser plate 15 and the like"). The light reflecting sheet 14a can be formed of a resin sheet having light reflectivity, for example.

An inverter board 30 to supply drive voltage to the cold cathode tubes 17 is mounted to the backlight chassis 14, or specifically, mounted on the opposite side of the cold cathode tubes 17 (i.e., on the opposite side of the light emitting surface). The inverter board 30 includes an inverter unit 40 arranged to drive the cold cathode tubes 17 and a light source driving circuit (or light source control device) 50 arranged to generate a signal to be used for control of the inverter unit 40. Further, a PLL (Phase Locked Loop) 60 as a correction circuit arranged to correct a signal generated from the light source driving circuit 50 is provided between the inverter unit 40 and the light source driving circuit 50.

Hereinafter, the general configuration of the light source driving circuit 50 and the signals to be generated from respective circuits will be explained with reference to FIGS. 3 and 4, respectively. The light source driving circuit 50 includes a PWM signal generating circuit (periodic signal generating circuit) 51, a current-controlled dimming signal generating circuit (aperiodic signal generating circuit) 52, and a mixing circuit (arithmetic logic circuit) 53. In order to regularly repeat on-off operation of the light sources, the PWM signal generating circuit 51 generates a PWM signal (periodic signal) Vpwm as a periodic pulse signal, which is synchronized with a vertical synchronizing signal generated from a video signal processing circuit (not shown). On the other hand, the current-controlled dimming signal generating circuit 52 generates a current-controlled dimming signal (aperiodic signal) Vant as an aperiodic pulse signal. The current-controlled dimming signal Vant includes the same number of pulses within one vertical period, as that of the PWM signal.

The PWM signal Vpwm and the current-controlled dimming signal Vant are individually inputted to the mixing circuit 53, which is connected to the PWM signal generating circuit 51 and the current-controlled dimming signal generating circuit 52. In the mixing circuit 53, a logical operation is performed on respective pulses of the signals. Thereby, the mixing circuit 53 superimposes the pulses of the aperiodic current-controlled dimming signal Vant on the pulses of the periodic PWM signal Vpwm, and thereby generates a light source control signal Vcon that includes pulses individually having different shapes, as shown in FIG. 4.

The PLL (or correction circuit) 60 generates a corrected light source control signal Vout as a result of correction for the light source control signal Vcon, which is performed so that the ratio of light-on periods in one vertical period coincides with the corresponding ratio provided by a PWM signal Vpwm as a reference signal, as follows.

The PLL 60 includes a reference signal generating unit (input section) 61, a phase comparator (detection section) 62, and a signal processing unit (output section) 63. The reference signal generating unit 61 receives a PWM signal Vpwm from the PWM signal generating circuit 51, and synchronizes the PWM signal Vpwm with a vertical synchronizing signal generated from the video signal processing circuit (not shown). The resultant signal is outputted to the phase comparator 62, as a reference signal to be used as a reference for correction.

The phase comparator 62 receives the light source control signal Vcon generated from the mixing circuit 53, and compares the waveform of the light source control signal Vcon with that of the above reference signal (or PWM signal Vpwm). The difference in ratio of light-on periods in one vertical period is detected as a phase difference, and an error component indicating the light-on period difference between the light source control signal Vcon and the reference signal is outputted to the signal processing unit 63.

The signal processing unit 63 generates, based on the received error component, a correction signal that is to be used for correcting the light source control signal Vcon so that the ratio of light-on periods in one vertical period coincides with that provided by the reference signal. The correction signal is outputted to the phase comparator 62 described above.

The phase comparator 62 superimposes the correction signal on the light source control signal Vcon, so that the ratio of light-on periods in one vertical period, provided by the light source control signal Vcon, approaches that provided by the reference signal. The detection of a phase difference by the phase comparator 62, the generation of a correction signal by the signal processing unit 63, and the correction of the light source control signal Vcon by the phase comparator 62 are iteratively performed. Consequently, correction for the light source control signal Vcon, originally having been inputted to the phase comparator 62, can be achieved so that the ratio of light-on periods in one vertical period coincides with the corresponding ratio provided by the reference signal. Thus, the signal is converted into a corrected light source control signal Vout capable of providing a constant ratio of light-on periods in one vertical period, and is outputted to the inverter unit 40, via the signal processing unit 63.

The inverter unit 40 applies a voltage based on the received corrected light source control signal Vout to the cold cathode tubes 17, so as to drive the cold cathode tubes 17.

As described above, according to the present preferred embodiment, the mixing circuit (arithmetic logic circuit) 53 performs a logical operation on a periodic PWM signal (periodic signal) Vpwm generated by the PWM signal generating circuit (periodic signal generating circuit) 51 and an aperiodic current-controlled dimming signal (aperiodic signal) Vant generated by the current-controlled dimming signal generating circuit (aperiodic signal generating circuit) 52, so as to generate a light source control signal Vcon that can be an aperiodic signal including pulses individually having different shapes. The light sources are controlled according to pulse shapes of the light source control signal Vcon, and therefore can be aperiodically turned on. Accordingly, the period of vibration of the backlight chassis 14 caused by leakage current from the light sources can be non-constant, resulting in prevention of increase in vibration amplitude of the backlight chassis 14. Consequently, the facilitation of generation of beat tones, which may be due to periodic vibration of the backlight chassis 14, can be prevented.

Further, the PLL (correction circuit) 60 corrects the light source control signal Vcon, so as to output a corrected light source control signal Vout capable of providing a constant time ratio between light-on periods and light-off periods in one vertical period. Specifically, the PLL 60 corrects the light source control signal Vcon using a PWM signal Vpwm as a reference signal generated by the PWM signal generating circuit 51, so that the ratio of light-on periods in one vertical period coincides with that provided by the reference signal. Thereby, a corrected light source control signal Vout capable of providing the ratio of light-on periods in one vertical period, being coincident with that provided by the PWM signal Vpwm, can be outputted. According to this construction, the periods of light-on of the light sources, in one vertical period as a reference period for one frame of images to be displayed, can be constant in time length, regardless of respective pulse shapes of the light source control signal Vcon. Consequently, the light sources can provide stable brightness, which enables provision of a high-quality display device.

Preferred Embodiment 2

Next, a preferred embodiment 2 of the present invention will be explained with reference to FIGS. 5 and 6. The difference from the above preferred embodiment 1 is that a light source control device preferably includes three PWM signal generating circuits, instead of including a PWM signal generating circuit and a current-controlled dimming signal generating circuit. The other constructions are preferably similar to the above preferred embodiment. Therefore, the same elements as the above preferred embodiment are designated by the same symbols, and redundant explanations are omitted.

Figure 5:
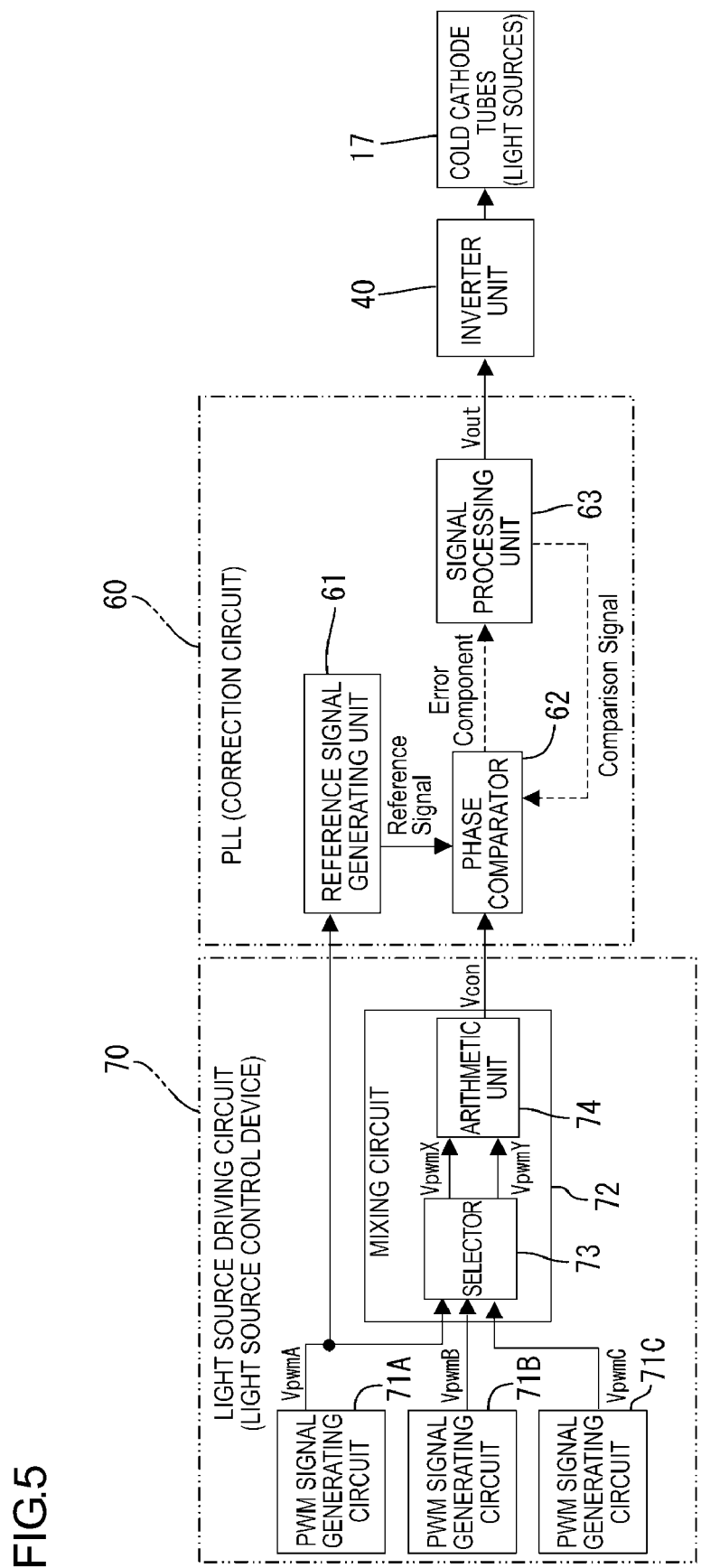
FIG. 5 is a block diagram showing a circuit configuration involved in light source control of a backlight device included in a liquid crystal display device according to preferred embodiment 2 of the present invention.
Figure 6:
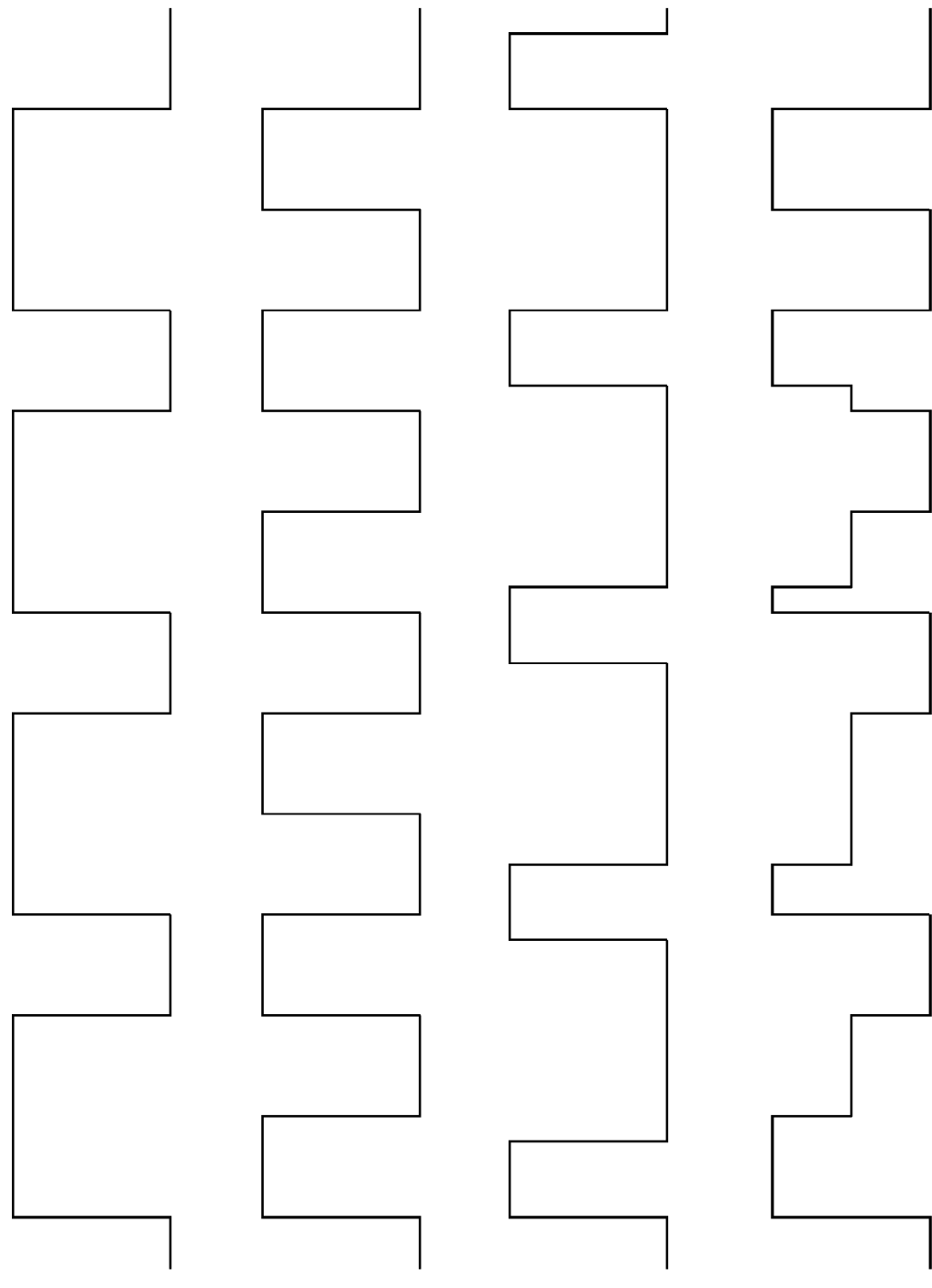
FIG. 6 is a waveform chart showing signals outputted from various sections of the backlight device shown in FIG. 5.

FIG. 5 is a block diagram showing a circuit configuration involved in light source control of a backlight device included in a liquid crystal display device according to the present preferred embodiment. FIG. 6 is a waveform chart showing signals outputted from various sections of the backlight device.

A light source driving circuit 70 preferably includes three PWM signal generating circuits 71A, 71B, 71C and a mixing circuit 72. The PWM signal generating circuits 71A, 71B, 71C generate pulse signals as PWM signals VpwmA, VpwmB, VpwmC at different frequencies, respectively, and outputs the signals to the mixing circuit 72.

The mixing circuit 72 includes a selector 73 and an arithmetic unit 74. The selector 73 randomly selects two kinds of PWM signals VpwmX, VpwmY from three kinds of PWM signals VpwmA, VpwmB, VpwmC for each time period, and outputs the selected signals. The arithmetic unit 74 performs a logical operation on respective pulses of the selected PWM signals VpwmX, VpwmY, and thereby generates an aperiodic light source control signal Vcon that includes pulses individually having different shapes. Thus, the mixing circuit 72 can generate an aperiodic light source control signal Vcon by the logical operation using the periodic PWM signals VpwmA, VpwmB, VpwmC.

The PLL 60 corrects the aperiodic light source control signal Vcon outputted from the mixing circuit 72, so that the ratio of light-on periods in one vertical period coincides with the corresponding ratio provided by a PWM signal VpwmA as a reference signal. Thereby, a corrected light source control signal Vout is generated. The corrected light source control signal Vout is outputted to the inverter unit 40. The inverter unit 40 applies a voltage based on the corrected light source control signal Vout to the cold cathode tubes 17, so as to drive the cold cathode tubes 17.

As described above, according to the present preferred embodiment, three PWM signal generating circuits 71A, 71B, 71C generate PWM signals VpwmA, VpwmB, VpwmC at different frequencies, respectively. Further, the mixing circuit 72 randomly selects two kinds of signals from the three kinds of PWM signals VpwmA, VpwmB, Vpwmc for each time period, and performs a logical operation on the signals. Thereby, an aperiodic light source control signal Vcon including pulses individually having different shapes can be outputted. The light sources are controlled according to pulse shapes of the light source control signal Vcon, and therefore can be aperiodically turned on. Accordingly, the period of vibration of the backlight chassis 14 caused by leakage current from the light sources can be non-constant, resulting in prevention of increase in vibration amplitude of the backlight chassis 14. Consequently, the facilitation of generation of beat tones, which may be due to periodic vibration of the backlight chassis 14, can be prevented.

Preferred Embodiment 3

A preferred embodiment 3 of the present invention will be explained with reference to FIG. 7. The difference from the above preferred embodiments 1 and 2 is that a previously-generated light source control signal is used as a reference signal, instead of using a PWM signal as a reference signal. The other constructions are preferably similar to the above preferred embodiments. Therefore, the same elements as the above preferred embodiments are designated by the same symbols, and redundant explanations are omitted.

Figure 7:
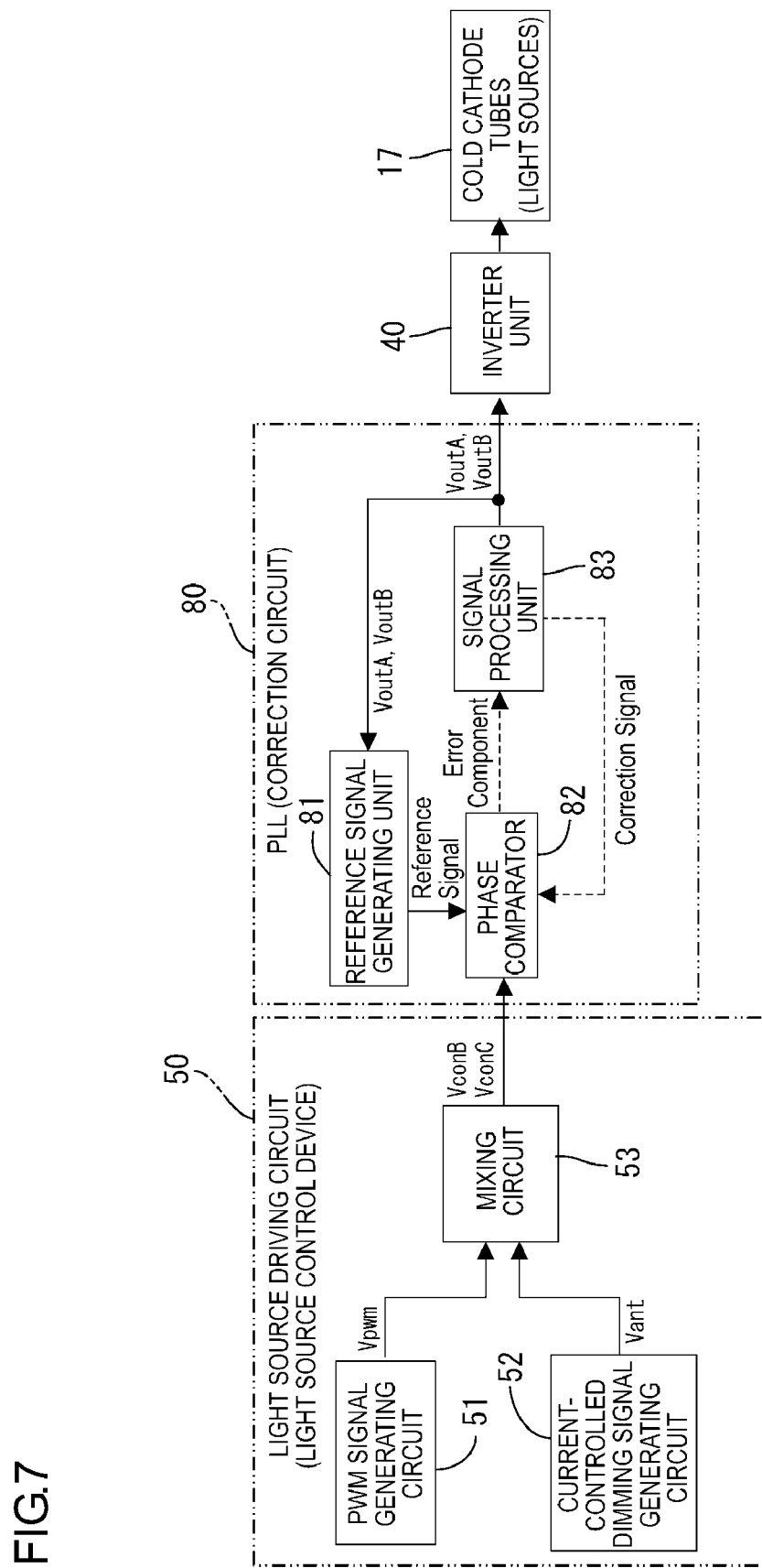
FIG. 7 is a block diagram showing a circuit configuration involved in light source control of a backlight device included in a liquid crystal display device according to preferred embodiment 3 of the present invention.

FIG. 7 is a block diagram showing a circuit configuration involved in light source control of a backlight device included in a liquid crystal display device according to the present preferred embodiment.

A PLL 80 includes a reference signal generating unit 81, a phase comparator 82, and a signal processing unit 83. The reference signal generating unit 81 receives a corrected light source control signal VoutA that has been previously corrected. The signal is synchronized with a vertical synchronizing signal generated from a video signal processing circuit (not shown), and the resultant signal is outputted to the phase comparator 82 as a reference signal to be used as a reference for correction.

The phase comparator 82 receives a light source control signal VconB generated from the mixing circuit 53, and compares the waveform of the light source control signal VconB with that of the above reference signal (i.e., the corrected light source control signal VoutA). The difference in ratio of light-on periods in one vertical period is detected as a phase difference, and an error component indicating the light-on period difference between the light source control signal and the reference signal is outputted to the signal processing unit 83.

The signal processing unit 83 generates, based on the received error component, a correction signal that is to be used for correcting the light source control signal so that the ratio of light-on periods in one vertical period coincides with that provided by the reference signal. The correction signal is outputted to the phase comparator 82 described above.

The phase comparator 82 superimposes the correction signal on the light source control signal VconB, so that the ratio of light-on periods in one vertical period, provided by the light source control signal VconB, coincides with that provided by the reference signal. Thus, the phase comparator 82 generates a corrected light source control signal VoutB capable of providing the ratio of light-on periods in one vertical period, which coincides with the ratio of light-on periods in one vertical period, provided by the reference signal.

The corrected light source control signal VoutB is outputted to the inverter unit 40 via the signal processing unit 83, and is also outputted to the reference signal generating unit 81 of the PLL 80. The reference signal generating unit 81 synchronizes the corrected light source control signal VoutB with a vertical synchronizing signal generated from the video signal processing circuit (not shown), and outputs the resultant signal to the phase comparator 82 as a reference signal to be used as a reference for correction.

The phase comparator 82 receives a subsequent light source control signal VconC, and compares the waveform of the signal with that of the reference signal, i.e., just-received corrected light source control signal VoutB that has been previously corrected as described above. The difference in ratio of light-on periods in one vertical period is detected as a phase difference. Thereafter, correction is performed by the phase comparator 82 and the signal processing unit 83 in a similar manner to the above correction, and thereby a corrected light source control signal VoutC is generated. The corrected light source control signal VoutC is outputted to the inverter unit 40 and also to the reference signal generating unit 81, via the signal processing unit 83.

As described above, according to the present preferred embodiment, the PLL 80 corrects a subsequently-received light source control signal VconB so as to correct the ratio of light-on periods in one vertical period, by using, as a reference, a corrected light source control signal VoutA obtained by correcting a previously-received light source control signal VconA. As a result, a corrected light source control signal VoutB is generated. Further, a newly-received light source control signal VconC is corrected by using the corrected light source control signal VoutB as a reference, and thereby a corrected light source control signal VoutC is generated. Thus, the PLL 80 iterates the correction cycles.

According to this construction, a corrected light source control signal Vout as a previously-corrected signal capable of constantly providing a steady light-on ratio is used as a reference for correction. The signal corrected using such a reference signal can also provide a constant light-on ratio. Therefore, when the light sources are controlled according to the corrected light source control signal Vout, the periods of light-on of light sources, in one vertical period as a reference period for one frame of images to be displayed, can be constant in time length, regardless of respective pulse shapes of the light source control signal Vcon. Consequently, the light sources can provide stable brightness, which enables provision of a high-quality display device.

Other Preferred Embodiments

Described above are preferred embodiments of the present invention. However, the present invention is not limited to the preferred embodiments explained in the above description with reference to the drawings. The following preferred embodiments may be included in the technical scope of the present invention, for example.

In the above preferred embodiments, an aperiodic light source control signal Vcon is generated preferably by performing a logical operation on signals generated from the PWM signal generating circuit 51 and the current-controlled dimming signal generating circuit 52. However, the PWM signal generating circuit need not necessarily be provided. That is, the aperiodic signal generating circuit may directly generate alight source control signal. In this case, an additional circuit is preferably provided to synchronize the light source control signal with a vertical synchronizing signal.

In the above preferred embodiment, two signals are preferably randomly selected for each time period from signals generated by three PWM signal generating circuits 71A, 71B, 71C. However, the configuration of the present invention is not limited to this combination, but rather may be any combination that includes at least three PWM signal generating circuits so that at least two PWM signals can be selected therefrom.

In the above preferred embodiments, a PWM signal or alight source control signal VconA is used as a reference signal. However, the reference signal is not limited to these signals. The reference signal generating unit may be configured to output reference signals having been prepared specially and preliminarily.

In the above preferred embodiments, cold cathode tubes 17 are preferably used as light sources, for example. However, another type of light sources such as hot cathode tubes may be used, for example.

In the above preferred embodiments, TFTs are preferably used as switching elements of the liquid crystal display device, for example. However, the present invention can be applied to a liquid crystal display device that uses another type of switching element other than TFTs (e.g., thin-film diodes (TFDs)). Further, the present invention can be applied to a liquid crystal display device for monochrome display, as well as a liquid crystal display device capable of color display.

Moreover, although a liquid crystal display device is shown in the above preferred embodiments, the present invention can be applied to other types of display devices than a liquid crystal type, which use a backlight device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A lighting device for a display device comprising:
a light source; and
a light source control device arranged to generate a pulse signal as a light source control signal to control the light source; wherein
the light source control signal is an aperiodic signal that includes pulses each having different shapes from each other;
the light source control device includes a periodic signal generating circuit, an aperiodic signal generating circuit, and a mixing circuit including an arithmetic logic circuit arranged to perform a logical operation on a plurality of signals;
the mixing circuit is arranged to generate the light source control signal by performing the logical operation on respective pulses of a periodic signal generated by the periodic signal generating circuit and an aperiodic signal generated by the aperiodic signal generating circuit and to superimpose the pulses of the aperiodic signal on the pulses of the periodic signal to generate the light source control signal;
the periodic signal generating circuit is arranged to generate a pulse signal defining the periodic signal including pulses provided at constant intervals and having a same shape; and
the aperiodic signal generating circuit is arranged to generate a pulse signal defining the aperiodic signal including pulses having a different shape, and a number of the pulses of the aperiodic signal is equal to a number of the pulses of the periodic signal in one vertical period.

2. A lighting device for a display device as in claim 1, wherein:
said periodic signal generating circuit includes at least three periodic signal generating circuits arranged to generate signals individually at different frequencies; and
said arithmetic logic circuit is arranged to generate said light source control signal by performing the logical operation on at least two periodic signals which are randomly selected for each time period from periodic signals generated from said periodic signal generating circuits.

3. A lighting device for a display device as in claim 1, further comprising:
a correction circuit provided between said light source and said light source control device, and
arranged to control said light source control signal generated by said light source control device so as to provide a constant time ratio between a light-on period and a light-off period in one vertical period.

4. A lighting device for a display device as in claim 3, wherein
said correction circuit includes:
an input section arranged to receive the periodic signal generated by said periodic signal generating circuit as a reference signal;
a detection section arranged to compare the light source control signal and the reference signal and to detect, as a phase difference, a difference in a ratio of a light-on period in one vertical period between said reference signal and said light source control signal; and an output section arranged to output a corrected light source control signal that is corrected based on said phase difference.

5. A lighting device for a display device as in claim 4, wherein:
the difference in the ratio that is detected by the detection section is an error component indicating the light-on period difference between the light source control signal and the reference signal; and
the correction circuit further includes a correction signal generating section arranged to generate a correction signal based on the error component.

6. A lighting device for a display device as in claim 5, wherein:
the correction circuit further includes a correction section arranged to correct the light source control signal based on the correction signal so that a ratio of light-on periods of the light source control signal in one vertical period coincides with a corresponding ratio provided by the reference signal of light on-periods of the reference signal in one vertical period.

7. A lighting device for a display device as in claim 3, wherein said correction circuit includes:

an input section arranged to receive, as a reference signal, a previous light source control signal that has been generated as said light source control signal;

a detection section arranged to detect, as a phase difference, a difference between said reference signal and a subsequent light source control signal in a ratio of light-on period in one vertical period; and an output section arranged to output a corrected light source control signal as a result of correcting said subsequent light source control signal by said phase difference.

8. A lighting device for a display device as in claim 1, wherein the periodic signal generating circuit generates a Pulse Width Modulation signal that regularly repeats on-and-off operations of the light source as the periodic pulse signal and the aperiodic signal generating circuit generates a current-controlled dimming signal as the aperiodic pulse signal.

9. A display device comprising:
a lighting device for a display device according to claim 1; and
a display panel arranged to perform display by use of light from said lighting device for a display device.

10. A display device as in claim 9, wherein said display panel is a liquid crystal panel including liquid crystal material.

* * * * *